Dec. 2, 1947.   M. PANTELEIEFF   2,432,038
AIR HEATING FURNACE
Filed Dec. 9, 1944   2 Sheets-Sheet 2
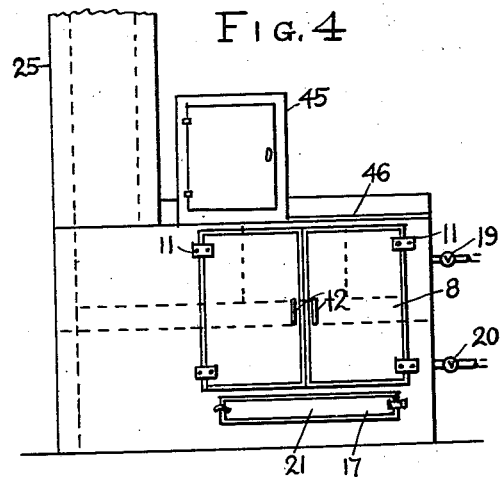
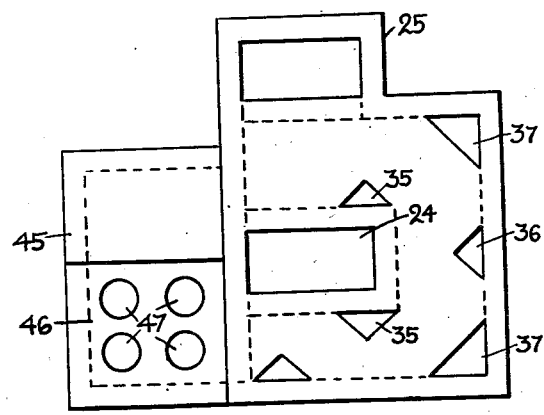
INVENTOR.
MAXIM PANTELEIEFF
BY John P. Nikonow
ATTORNEY Patented Dec. 2, 1947

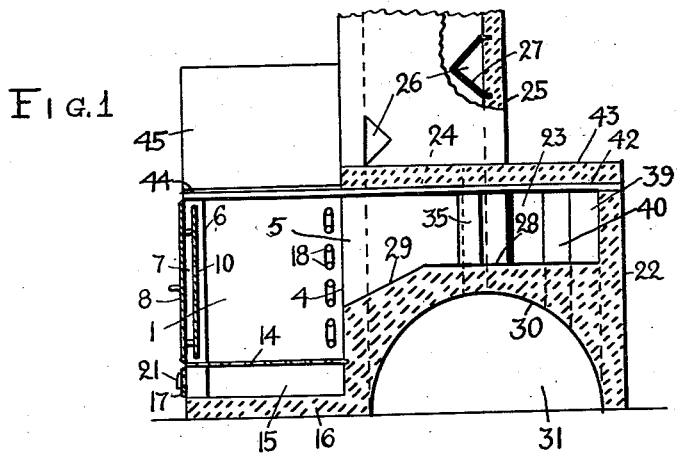
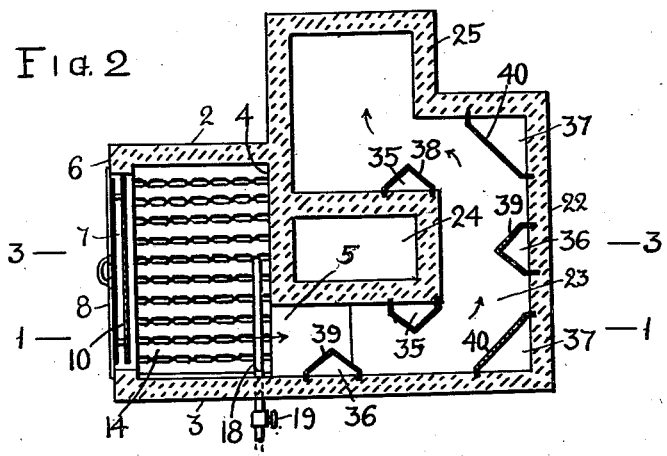
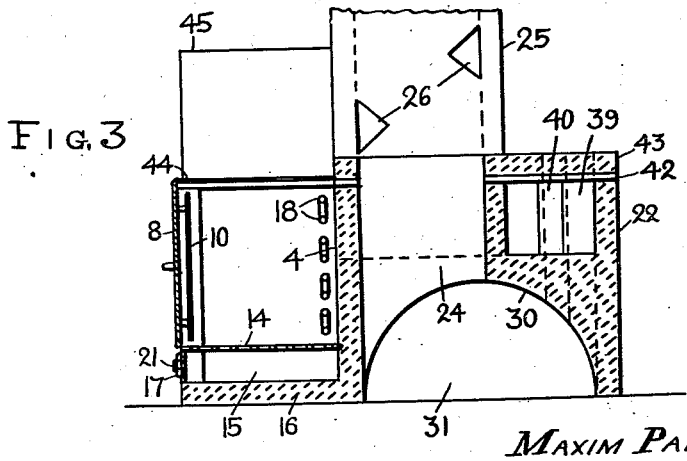

2,432,038

UNITED STATES PATENT OFFICE 2,432,038

AIR-HEATING FURNACE

Maxim Panteleieff, New York, N. Y.

Application December 9, 1944, Serial No. 567,498

2 Claims. (Cl. 126—100)

My invention relates to furnaces and has particular reference to furnaces for heating dwellings and, more particularly, to furnaces for a double duty, i. e. for heating and for cooking.

My invention has for its object to provide a furnace which can be used with any ordinary fuel such as coal, wood, oil, etc. and in which the heat developed by the combustion can be utilized to the highest degree, particularly for heating the air surrounding the furnace, means being also provided for heating water for household purposes and for cooking meals.

I have found that a very efficient utilization of the furnace heat can be obtained by providing air ducts across the flues for hot gases between the furnace and the chimney, the air ducts extending preferably in a vertical direction so that cold air is admitted below the ducts and is allowed to rise in the ducts while it is being heated emerging into the surrounding space at the top of the furnace. Such heating ducts can be preferably made of a thin sheet metal to facilitate the heat exchange between the flue gases and the outside air.

Additional heat exchanging ducts can be also provided across the chimney in its lower portion which passes inside the house, for heating the upper stories or the upper portion of the room in which the chimney is located.

In a modified form my invention can be also applied to small heating furnaces such as ordinary fireplaces for increasing their heating capacity without increasing the fuel consumption.

My invention is more fully described in the accompanying specification and drawings in which:

Fig. 1 is a sectional elevational view of my furnaces taken on the line 1—1 of Fig. 2;

Fig. 2 is a sectional plan view of the same;

Fig. 3 is another sectional elevational view, taken on the line 3—3 of Fig. 2;

Fig. 4 is a front view of my furnace;

Fig. 5 is a top plan view of the same.

My furnace as shown in Figs. 1 to 5 inclusive, comprises a combustion chamber 1 enclosed at the sides by walls 2, 3 made of brick or similar refractory material, at the rear with a wall 4 with a flue opening 5, and at the front with a wall 6 having a large opening 7 for doors 8. The doors are preferably made with rear metal plates 10, spaced from the front plates to protect the front plates from the heat of the furnace. The doors are hinged at 11 to the front wall and are provided with handles 12.

The bottom of the combustion chamber is formed by a grate 14 under which a space 15 is provided for admitting air to the grate and for collecting ashes on a floor 16 made of brick. A door 17 is provided at the front serving as a damper for regulating the draft or the amount of air admitted to the fuel thereby regulating the rapidity of its consumption. Fireguards 21 may be provided in the damper door 17, especially useful when wood is used as fuel. Iron pipes 18 are provided at the rear wall 4 for heating water for household purpose if the water is allowed to flow at a relatively high rate, or for providing steam if the rate of water flow is sufficiently retared by manipulating valves 19, 20.

The side walls 2, 3 extend behind the furnace to a second rear wall 22, forming a flue 23 around a central vertical duct 24 which is also made of brick, the front wall of this duct being formed by the rear wall 4 of the combustion chamber 1. The flue 23 extends into a chimney 25. The portion of the chimney inside the house is provided with heat exchanging transverse ducts 26 formed by angular sheet metal baffles in the shape of troughs attached at their longitudinal edges to the front and rear walls of the chimney and extending to the outside. The baffles form a zig-zag passage for the flue gases inside the chimney, retarding their flow and causing them to lose their heat to the baffle plates 27 for heating the air circulating through the ducts 26.

The brickwork is raised under the flue, forming a floor 28, the front portion of the floor being inclined toward the combustion chamber at 29. The floor 28 is supported on an arch 30, forming a transverse opening 31 extending from one side of the furnace to the other. The duct 24 extends into the opening 31 at the bottom and into the outside air at the top, allowing the cold air from the space 31 to rise through the duct 24 and to emerge into the room outside after being heated by the hot gases in the flue 23.

Additional vertical heat exchanging ducts 35, 36, 37 are provided for conducting the cold air from the space 31 to the space above the furnace. The ducts 35 are formed by angular metal baffle plates 38 attached to the walls of the duct 24. The ducts 36 are formed by similar angular baffles 39 attached to the walls 4 and 22. The ducts 37 are formed by straight metal plates 40 attached to the walls 3 and 22 at the corners where the walls converge, thereby also forming triangular ducts.

The vertical ducts in the flue 23 retard the flow of the hot gases, causing them to follow a zig-zag path while surrendering a large portion of their heat to the metal walls of the ducts, which serve as heaters for the outside air.

A relatively large amount of brickwork in the furnace and its flues makes it possible to store the heat of the furnace for a long time after the furnace is shut down, the hot walls continuing to heat the air, circulating through the ducts.

The roof of the furnace above the flue 23 is made of steel beams 42, supporting a layer of brick 43. The front portion of the roof is made of a metal plate 44 which supports at the left an ordinary oven 45 for baking, roasting, etc., and a range plate 46 with openings 47 for cooking pots and pans.

It will be understood that various features and principles of the embodiment of the invention above described or referred to may be utilized or substituted in the other embodiments.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. A furnace comprising a brickwork with walls at the sides, at the front and at the rear, resting on the ground, and a roof; a chimney extending through the roof; the front portion of the brickwork forming a combustion chamber; an arch supporting the main portion of the brickwork at an elevation above the ground, the arch forming a transverse passage extending from one side of the brickwork to the other; centrally disposed vertical walls extending between the arch and the roof and forming with the side walls of the brickwork a U-shaped flue between the combustion chamber and the chimney, the central walls enclosing a duct extending through the arch below and the roof above; and a plurality of vertically extending angular members in the flue made of sheet metal, the longitudinal edges of the members being imbedded in the brickwork, the members thereby forming ducts, the arch and the roof having openings in communication with the ducts.

2. A furnace comprising a brickwork with walls at the sides, at the front and at the rear, resting on the ground, and a roof; a chimney extending through the roof; the front portion of the brickwork forming a combustion chamber; an arch supporting the main portion of the brickwork at an elevation above the ground, the arch forming a transverse passage extending from one side of the brickwork to the other; centrally disposed vertical walls extending between the arch and the roof and forming with the side walls of the brickwork a U-shaped flue between the combustion chamber and the chimney, the central walls enclosing a duct extending through the arch below and the roof above; a plurality of vertically extending angular members in the flue made of sheet metal, the longitudinal edges of the members being imbedded in the brickwork, the members thereby forming ducts, the arch and the roof having openings in communication with the ducts; and a plurality of horizontally extending angular sheet metal members, the edges of the horizontal members being imbedded in the walls of the chimney, the horizontal members thereby forming air ducts, the walls of the chimney having openings in communication with the ducts in the horizontal members.

MAXIM PANTELEIEFF.

REFERENCES CITED

The following references are of record in the file of this patent:

UNITED STATES PATENTS

| Number | Name | Date |
| --- | --- | --- |
| 20,733 | Savage | June 29, 1858 |
| 1,464,892 | Twogood | Aug. 14, 1923 |
| 1,208,790 | Junkers | Dec. 19, 1916 |
| 559,918 | Twitchell et al. | May 12, 1896 |
| 700,664 | Lee et al. | May 20, 1902 |
| 306,878 | Turner et al. | Oct. 21, 1884 |
| 484,113 | Ruehle | Oct. 11, 1892 |
| 654,719 | Ebinger | July 31, 1900 |